United States Patent [19]

Ishikawa

[11] Patent Number: 4,642,472

[45] Date of Patent: Feb. 10, 1987

[54] OPTICAL IMAGE READER FOR READING AN IMAGE ON A GIVEN MANUSCRIPT

[75] Inventor: Yujiro Ishikawa, Toyoda, Japan

[73] Assignee: Brother Industries, Ltd., Nagoya, Japan

[21] Appl. No.: 645,046

[22] Filed: Aug. 28, 1984

[30] Foreign Application Priority Data

Aug. 31, 1983 [JP] Japan .................................. 58-160112

[51] Int. Cl.⁴ .......................... H04N 1/028; H04N 1/06
[52] U.S. Cl. ..................................... 250/578; 250/235;
358/213; 358/264; 358/293
[58] Field of Search ........................ 250/578, 234–235;
358/212, 213, 264, 285, 292–294

[56] References Cited

U.S. PATENT DOCUMENTS 4,245,259 1/1981 Pick ...................................... 358/293
4,255,767 3/1981 Frey ..................................... 358/293
4,327,380 4/1982 Yamada et al. ..................... 358/264
4,367,493 1/1983 Matteson ............................ 358/213

Primary Examiner—Edward P. Westin
Attorney, Agent, or Firm—Kane, Dalsimer, Kane, Sullivan and Kurucz

[57] ABSTRACT

An optical image reader is disclosed which effects the reading of an image on a given manuscript by moving a reading head provided with a plurality of photosensors over the surface of the manuscript and enabling the photosensors to directly discern the image information on the manuscript. In the optical image reader, the photosensors in the reading head are sequentially deviated in a direction perpendicular to the direction of the movement of the reading head and, therefore, are able to read the image information on the read points on the manuscript face to correspondingly deviated time intervals. Thus, the optical image reader operated at a high speed without any interruption.

10 Claims, 10 Drawing Figures

OPTICAL IMAGE READER FOR READING AN IMAGE ON A GIVEN MANUSCRIPT

BACKGROUND OF THE INVENTION (1) Field of the Invention

This invention relates to an optical image reader, and more particularly to an optical image reader which effects the reading of an image on a given manuscript by moving over the surface of the manuscript an image reading head provided with a plurality of photosensors and enabling the photosensors to discern the image.

(2) Description of the Prior Art

The conventional optical image reader is provided with an image reading head 1 which, as illustrated in the drawing FIG. 9, has eight reflection type photosensors r1–r8 arrayed at regular intervals in the order of their ordinal numbers in a direction perpendicular to the direction of reading.

The image reading head 1 constructed as described above is intermittently moved over a manuscript face 2 so as to read sequentially the image informations falling on a plurality of rows each consisting of read points coinciding with the aforementioned photosensors r1–r8. To be more specific, it moves by alternately repeating stops (for reading) and moves (to transfer to the next rows) leftwardly over the manuscript face 2 so as to read the image information at the read points a1 . . . an, ~, h1 . . . hn in the successive rows. The intermittent movement of the image reading head 1 relies on the use of a microcomputer 3 and a stepper motor 5, as illustrated in the drawing FIG. 10. Specifically, based on the control signals issued from the microcomputer 3 via a motor drive circuit 4, the stepping motor 5 is intermittently driven and a conveyor belt 6 to which the head 1 is attached is intermittently moved by the stepping motor 5.

In the optical image reader operated by the principle described above, while the image reading motion is very quick, the time the head 1 requires between the moment it starts a stopping motion and the moment it completes the stopping motion is too long to be ignored and is liable to lengthen the overall operation of the head 1. Moreover, since the head 1 is moved intermittently by alternating the moves and stops, the optical image reader does not have much room for further improvement in the reading speed. The heavy power consumption by the stepper motor 5 has also raised a problem from an economic point of view.

SUMMARY OF THE INVENTION

This invention has originated in the effort directed to eliminating the various drawbacks mentioned above.

One objective of this invention is to provide an optical image reader which is so simple in construction as to permit an increase to the image reading speed.

Another objective of this invention is to provide an optical image reader which permits reduction in the consumption of electric power for the movement of the image reading head.

To accomplish the objectives described above, the optical image reader of this invention is constructed so as to effect the reading of an image on a given manuscript by causing a reading head provided with a plurality of optical reading parts to be moved relative to the manuscript in a direction perpendicular to the direction of the arrangement of the reading parts and consequently enabling the reading parts directly to discern the image on the manuscript, which optical image reader is characterized by the aforementioned reading parts being deviated stepwise in the direction of the movement of the reading head and being so adapted that they are sequentially actuated to discern the image informations on the manuscript in the order in which they reach the read points falling on their fixed paths in consequence of the relative motion between the manuscript and the reading head.

The other characteristics and advantages of this invention will become apparent from the further disclosure of the invention to be made in the following detailed description of a preferred embodiment with reference to the accompanying drawings.

DETAILED DESCRIPTION OF THE PREFERRED EMBODIMENT

Now, one preferred embodiment of this invention will be described below with reference to the accompanying drawings.

Figure 1:
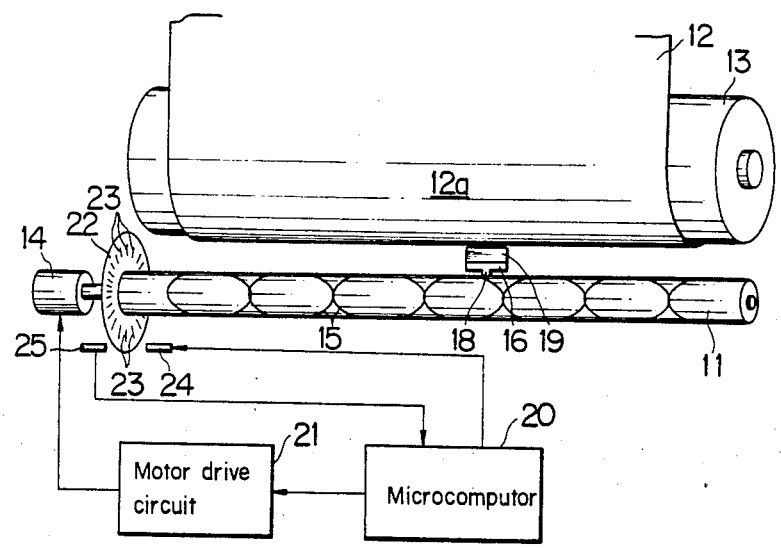
FIG. 1 is a perspective view illustrating an optical image reader of this invention in combination with the peripheral elements thereof.

With reference to FIG. 1, a driver shaft 11 is supported at the opposite ends thereof on a frame (not shown) of an optical image reader and is disposed parallel to a support drum 13 serving to forward and control a manuscript 12. A driver shaft 11 has a spiral cam groove 15 incised in the peripheral surface thereof and has one of the opposite ends thereof protruded out of the frame and connected to a DC motor 14.

Figure 2:
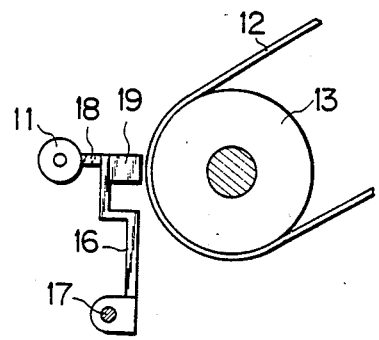
FIG. 2 is a side view illustrating the optical image reader of this invention and the peripheral elements thereof.

A holder 16 has its base part movably supported on a guide shaft 17 which is disposed, as illustrated in FIG. 2, below the driver shaft 11 parallel thereto. An engaging piece 18 formed on the rear side of the leading end part of the holder 16 is supported as fitted in the spiral cam groove 15. When the driver shaft 11 is set rotating by the DC motor 14, therefore, the holder 16 is reciprocated along the guide shaft 17 or the axis of the support drum 13 in consequence of the engagement between the spiral cam groove 15 and the engaging piece 18.

An image reading head 19 is attached to the front side of the leading end part of the holder 16 and is opposed to the manuscript face 12a of the manuscript 12 wrapped on the support drum 13. As a consequence of the movement of the holder 16, the reading head 19 is able to read the image recorded on the manuscript 12 sequentially in a lateral direction.

Figure 3:
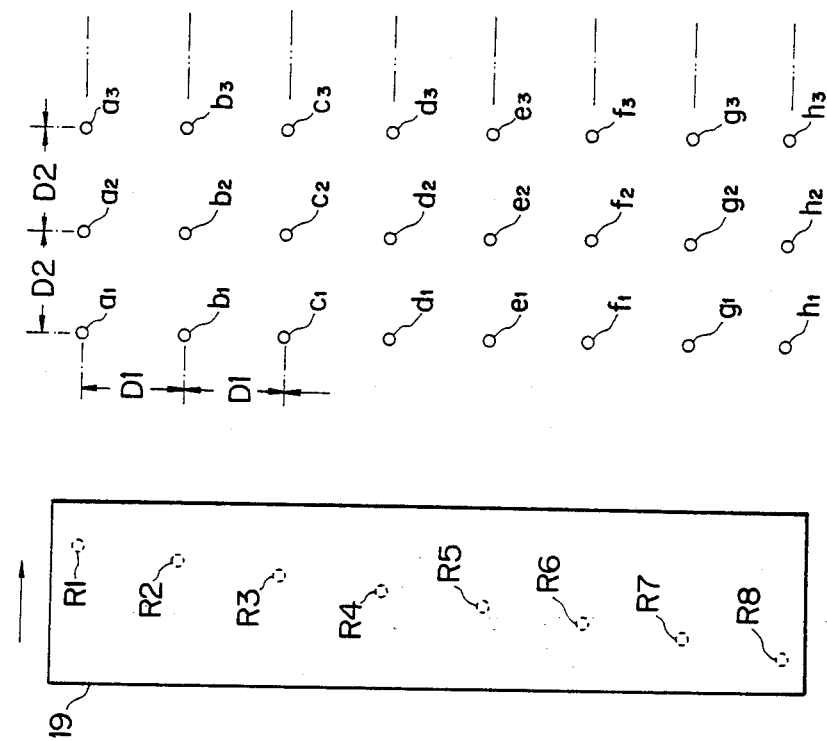
FIG. 3 is a diagram illustrating the reading operation produced by the optical image reader as one preferred embodiment of this invention.

The read points on the manuscript 12 are fixed in advance. To be more specific, the read points are arranged in a plurality of rows each containing a fixed plurality of read points. As illustrated in FIG. 3, eight read points are arranged at regular intervals of D1 in a direction perpendicular to the direction of the movement of the head 19 (a horizontal direction). From this vertical row of eight read points, the first through eighth read points a1 . . . , b1 . . . , ~, h1 . . . of the plurality of rows are arrayed in a horizontal direction at fixed intervals D2 (=D1).

Figure 4:
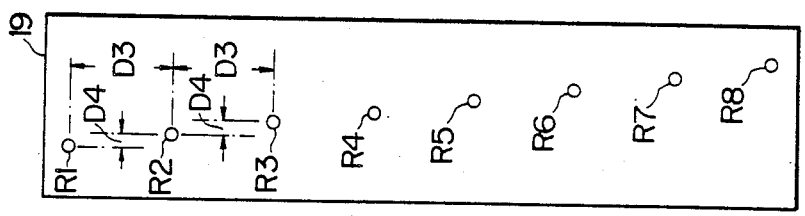
FIG. 4 is a diagram illustrating a typical reading head in the optical image reader of FIG. 3.

The image reading head 19 is provided with eight reflection type photosensors (hereinafter referred to merely as "photosensors") R1-R8 as optical reading parts directed toward the manuscript face 12a. These photosensors R1-R8, as illustrated in FIG. 4, are arranged in a vertical direction at fixed intervals D3 (=D1) in the order of their ordinal numbers and deviated stepwise at fixed intervals D4 (=D2/8=D3/8) in a lateral direction. The first through eighth photosensors R1-R8 are adapted to read the corresponding first through eighth read points a1 . . . , ~, h1 . . . of the successive rows as they pass over the read points successively. In this case, when the head 19 is moved rightwardly as illustrated in FIG. 3, the read points of the first row are sequentially read in the order of their ordinal numbers by the first through eighth photosensors R1-R8 at fixed time intervals. Then the read points a2, b2~h2 of the second row are read sequentially in the same manner as described above.

The DC motor 14 used to drive the driver shaft 11 is adapted to be driven at a fixed rotational speed in accordance with the drive control signal issued from a microcomputer 20 via a motor drive circuit 21. The rotation produced by the DC motor 14 imparts a reciprocating motion of equal speed to the image reading head 19 in the lateral direction. Consequently the image reading head 19 is always moved at a fixed speed.

A rotary plate 22 of a larger diameter than the driver shaft 11 is attached to one end of the driver shaft 11. This rotary plate 22 is adapted to be rotated in conjunction with the driver shaft 11. Along the periphery of this rotary plate 22, a multiplicity of slits 23 are cut concentrically as regularly spaced circumferentially.

On one side of the rotary plate 22, a light emitting element 24 formed by a light emitting diode is disposed to be directed toward the slits 23. This light emitting element 24 is actuated to emit light by the drive signal from the microcomputer 20. On the other side of the rotary plate 22, a light sensitive element 25 formed by a phototransistor is placed so as to be opposed to the light emitting element 24 across the slits 23. This light sensitive element 25 is adapted to detect the light from the light emitting element 24 and to issue a detection signal to the microcomputer 20. This detection signal enables the microcomputer 20 to detect the passage of one slit 23 across the light sensitive element 25.

The slits 23 described above serve as a means for detecting the time intervals at which the photosensors R1-R8 pass the respective read points in the successive rows. The circumferential intervals of the slits 23 are to be determined by the relationship between the rotational speed of the slits 23 and the moving speed of the head 19. To be more specific, the circumferential intervals of the slits 23 are fixed so that each time one of the slits 23 passes the gap between the two elements 24, 25, one of the eight photosensors R1-R8 of the head 19 passes the corresponding read point.

The microcomputer 20 feeds the drive control signal to the motor drive circuit 21 and the drive signal to the light sensitive element 25. Further, the microcomputer 20 discriminates the moving position of the image reading head 19 based on the detection signal from the light sensitive element 25, performs an arithmetic operation to determine which of the photosensors R1-R8 is currently passing the corresponding read point, actuates the photosensor currently in the process of passing the read point and reads and processes the image information falling on that read point.

Now, the operation of the optical image reader constructed as described above will be explained below.

The manuscript 12 having an image recorded on the manuscript face 12a is set on the support drum 13 and the image reading head 19 is moved at an equal speed rightwardly over the manuscript face 12a. The rotary plate 22 is set rotating at the same time. The microcomputer 20 calculates the moving position of the head 19 based on the detection signal from the light sensitive element 25 serving to detect the slit 23 in consequence of the rotation of the rotary plate 22. As the microcomputer 20 judges the passage of the first photosensor R1 over the first read point a1 of the first row based on the detection signal from the light sensitive element 25, it immediately issues an operation signal to the first photosensor R1 to effect the reading of the image information on the first read point a1. As the first photosensor R1 completes reading the image information on the first read point, the microcomputer 20 awaits the next detection signal from the light sensitive element 25.

After the first photosensor R1 has completed passing over the first read point a1 and the head 19 has advanced by one interval D4 between the two adjacent photosensors in the lateral direction, namely when the second photosensor R2 verges on the second read point b1 in the first row, the light sensitive element 25 issues the next detection signal. In response to this detection signal, the microcomputer 20 immediately issues an operation signal to the second photosensor R2 to effect the reading of the image information on the second read point b1. When the second photosensor R2 has completed reading the image information on the second read point b1 in the first row, the microcomputer 20 is left awaiting the next detection signal from the light sensitive element 25.

Thereafter, the third through eighth photosensors R3-R8 pass over the corresponding read points sequentially in the order of their ordinal numbers as the image reading head 19 completes its travel over each interval D4 between the photosensors in the lateral direction. Based on the detection signals from the light sensitive element 25, the microcomputer 20 performs arithmetic operations for determination of the individual passages to effect reading of image information on the read points c1-h1 in the same way as described above.

After the image information on the eighth read point h1 has been read to complete the reading of the image information on all the read points a1-h1 in the first row, the microcomputer 20, while awaiting the next detection signal from the light sensitive element 25 or while the first photosensor R1 is in the process of passing over the first read point a2 of the second row, causes the image information on the read points a1-h1 in the first row to be stored as image data for the first row in the memory device incorporated in the microcomputer 20.

After the image data of the first row has been stored in the memory device and the first photosensor R1 has reached the first read point a2 in the second row, the reading of the image information on the individual read points of the second row is effected by the same procedure as described above. This reading operation is repeated on each of the succeeding rows in the same manner. When the reading of the image information in each of the rows on the manuscript face 12a is completed, the support drum 13 advances the manuscript 12 by one step and the head 19 has the direction of travel changed by the spiral cam groove 15 on the driver shaft 11. In this case, the timing by which the reading of the image information on the individual read points is carried out remains unchanged. Only the reading proceeds in the reversed direction, namely, from the eighth through first photosensors R8–R1 in the decreasing order of their ordinal numbers.

As described above, since the first through eighth photosensors of the reading head 19 are arranged at fixed intervals D3 in a vertical direction and deviated stepwise at the fixed intervals D4 (=D2/8) in a lateral direction, when the reading head 19 is moved at a fixed speed in a lateral direction over one vertical row in which the eight read points are arranged at fixed intervals, the photosensors of the reading head 19 pass their corresponding read points at fixed time intervals. In this construction, the head 19 is no longer required to be stopped each time the reading of image information on the read points in one vertical row is completed. Thus, the overall reading speed permitted by the optical image reader of this invention is much higher than that of the conventional countertype. Since the head 19 is always moved at a fixed speed by the DC motor 14 without any interruption, the electric power consumed for the movement of the reading head 19 is smaller than when the head is driven by a stepper motor.

This invention is not limited to the preferred embodiment so far described. The number of photosensors incorporated in the image reading head 19 may be varied and the number of read points in each of the vertical rows may be suitably varied. In this case, the interval D4 separating the photosensors in the lateral direction is required to be M.D2/N or less, where N denotes the number of photosensors (or the number of read points in one row). Here, M denotes the number of read points on which the reading of the image information at the same time. In the preceding embodiment, M is 1.

Optionally, the first through eighth photosensors R1-R8 arranged in the lateral direction may be slanted opposite to those in the preceding embodiment, so that when the reading head 19 is moved rightwardly, these photosensors will start reading the image information sequentially in the decreasing order of the ordinal numbers.

FIG. 5 through FIG. 8 represent other embodiments of this invention.

Figure 6:
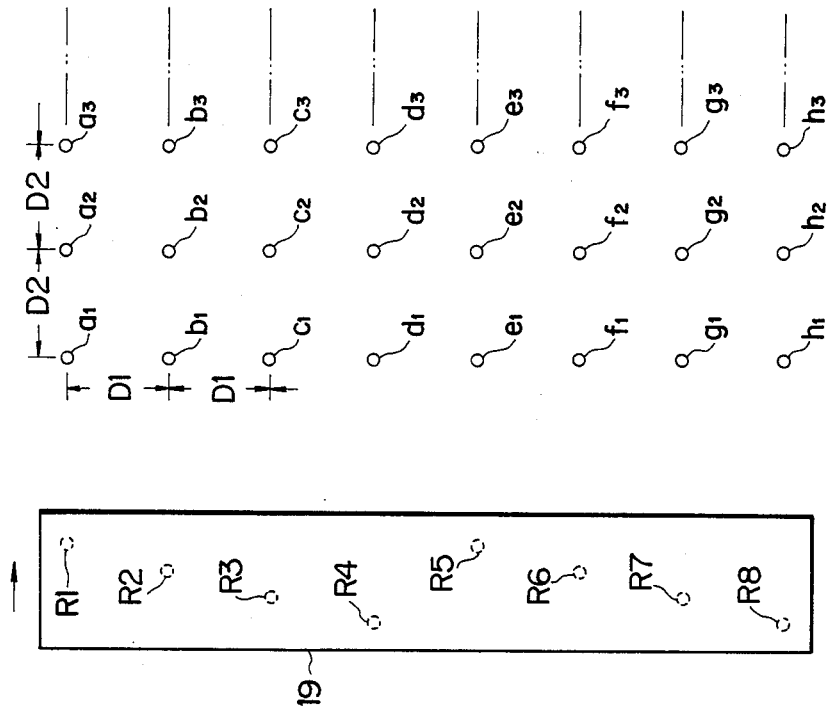
FIG. 6 is a diagram for illustrating the reading operation to be produced by the optical image reader of this invention using the reading head of FIG. 5.
Figure 5:
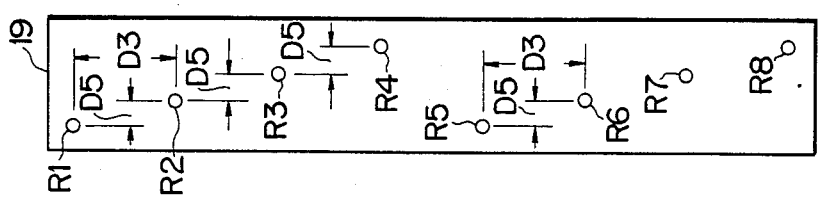
FIG. 5 is a diagram illustrating another embodiment of the optical image reader of this invention.

In the optical image reader illustrated in FIG. 5 and FIG. 6, the photosensors R1-R8 incorporated in the image reading head 19 are arranged as divided into two groups. To be more specific, the first through fourth photosensors R1-R4 are deviated in the lateral directions by fixed intervals D5 (=D2/4, on condition that M=2 and N=8) or less and, at the same time, the fifth through eighth photosensors R5-R8 are deviated in the same pattern as the first through fourth photosensors R1-R4, so that the first and fifth photosensors R1, R5, the second and sixth photosensors R2, R6, and so on will respectively start reading the image information at the same time.

Figure 8:
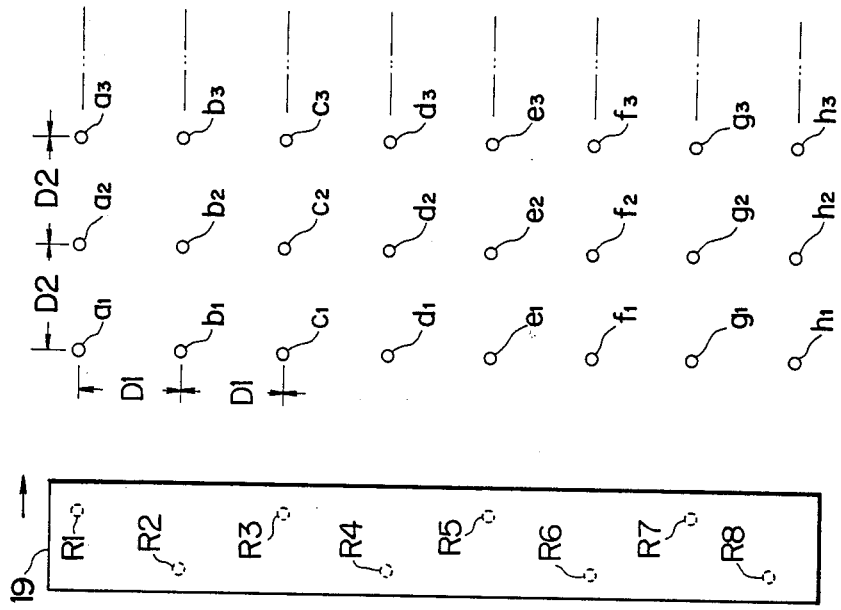
FIG. 8 is a diagram for illustrating the reading operation to be produced by the optical image reader of this invention using the reading head of FIG. 7.
Figure 7:
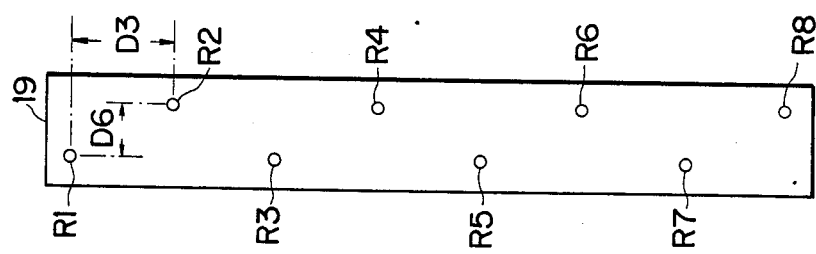
FIG. 7 is a diagram illustrating yet another embodiment of the optical image reader of this invention.
Figure 9:
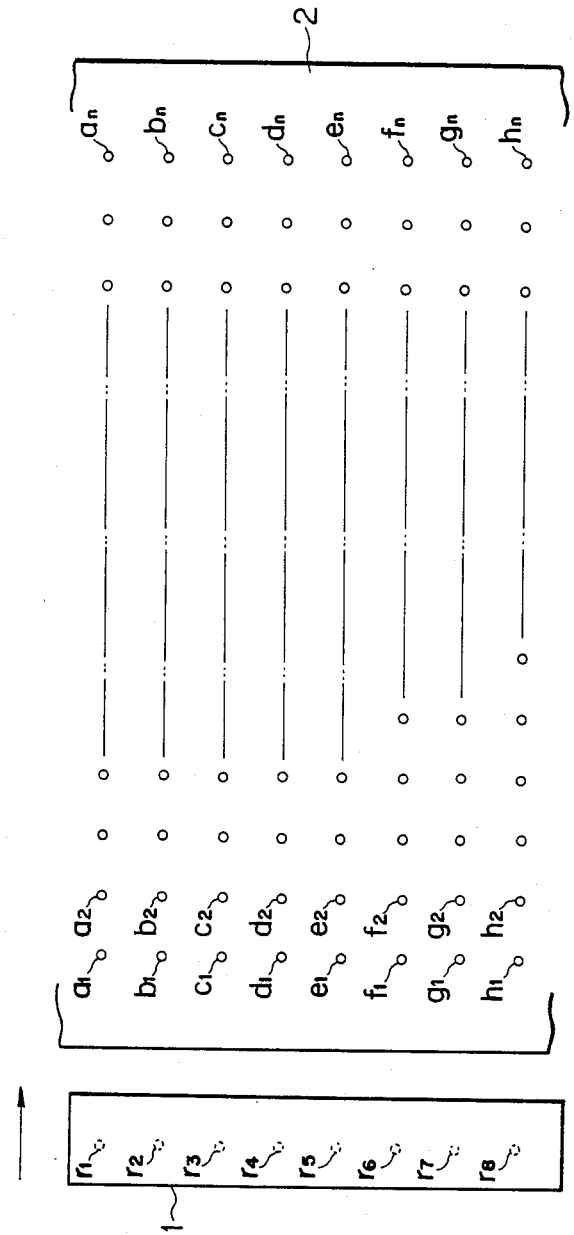
FIG. 9 is a diagram illustrating the reading operation produced by a prior art optical image reader.
Figure 10:
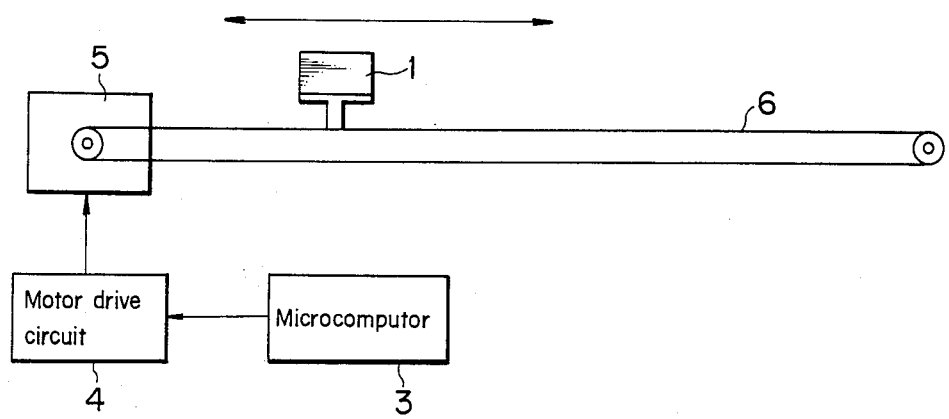
FIG. 10 shows the elements of a prior art optical image reader operating as described in FIG. 9.

In the optical image reader illustrated in FIG. 7 and FIG. 8, the even-numbered (second, fourth, sixth, and eighth) photosensors R2, R4, R6 and R8 are deviated from the odd-numbered (first, third, fifth, and seventh) photosensors R1, R3, R5, and R7 by fixed intervals D6 (=D2/2 on condition that M=4, N=8), so that the reading of the image information will occur on four read points at the same time.

What is claimed is:

1. An optical reader for reading an image made up to a plurality of image points arranged at predetermined intervals in a first direction and formed on a manuscript comprising:
    a reading head with a plurality of reading elements arranged in a second direction different than said first direction, said head being moveable in a third direction perpendicular to said first direction with respect to said manuscript, to bring sequentially each of said ready elements in a coincident position with one of said points; and
    means for selectively activating the elements in said coincident position, to discern the image.

2. The optical image reader of claim 1 wherein said manuscript is positioned with its width oriented along said third direction.

3. An optical image reader for reading an image formed by a plurality of points arranged in columns extending in a first direction at a first predetermined spacing, and rows extending in a second direction at a second predetermined spacing, said points being disposed on a manuscript, comprising:
    means for selectively feeding said manuscript in said first direction;
    a reading head having a plurality of reading elements arranged in a third direction different from said first direction;
    means for moving said head in said second direction to bring successively each of said elements to a coincident position with one of said points in a column;
    means for activating the element in the coincident position for discerning said image; and
    means for detecting the positions of said elements with respect to said manuscript for synchronizing said activating means with said coincident positions.

4. The optical image reader of claim 3 wherein said reading elements are disposed on a line oriented along said third direction.

5. The optical image reader of claim 3 wherein said reading elements are disposed on a plurality of parallel lines of oriented along said third direction.

6. The optical image reader of claim 3 wherein said reading elements are disposed at a first interval along said first direction and a second interval along said second direction.

7. The optical image reader of claim 3 wherein said reading elements are arranged to read a first set of rows as said head is moved once along said second direction, and a second set of rows when said head is reversed.

8. The optical image reader of claim 3 wherein said reading head is moved at a preset speed along said second direction.

9. The optical image reader of claim 3 wherein said detecting means consists of a rotary disk with slits corresponding to said reading elements, the position of said slits being indicative of the position of the reading elements; a light emitting element arranged on one side of the disk and a light receiving element arranged on the other side of the disk for receiving light through said slits.

10. The optical image reader of claim 5 wherein a portion of said plurality of reading elements disposed on a different parallel lines in said third direction is also arranged on a common line in said first direction, said portion of reading elements being actuated simutaneously by said actuating means.

* * * * *